United States Patent [19]
Shih

[11] Patent Number: 5,958,260
[45] Date of Patent: Sep. 28, 1999

[54] EYE MOLD DEVICE FOR CALIBRATING THE ELECTRODE OF AN ELECTRICAL MACHINING APPARATUS

[76] Inventor: Chiao-Chin Shih, No. 6, La. 1, Ta Hsin Rd. Pu Yen Hsiang, Chang Hua Hsien, Taiwan

[21] Appl. No.: 08/912,525

[22] Filed: Aug. 18, 1997

[51] Int. Cl.$^6$ .................................................. B23H 1/04
[52] U.S. Cl. ............................................... 219/69.15
[58] Field of Search ............................... 219/69.15, 69.17, 219/69.2, 69.12

[56] References Cited

U.S. PATENT DOCUMENTS

| | | | |
|---|---|---|---|
| 4,686,344 | 8/1987 | Nakayama | 219/69.12 |
| 5,585,013 | 12/1996 | Truty | 219/69.15 |

*Primary Examiner*—Geoffrey S. Evans
*Attorney, Agent, or Firm*—Beveridge, DeGrandi, Weilacher & Young, LLP

[57] ABSTRACT

An eye mold device for electrical machining device in which the electrode with different outer diameter can be readily and firmly supported within the eye mold for machining. A substantially triangular passage is defined by three accurate rods which are disposed within a mounting groove of a receiving barrel. When the electrode is inserted within the triangular passage, the electrode can be vertically and firmly supported and calibrated therein. By this arrangement, the electrode can be prevented from skewing during the machining process. On the other hand, the circularity and verticality of the performed hole can be kept. The size of the triangular passage is defined and dependent upon the outer diameter of the three accurate rods. In practice, the three accurate rods are selected and based on the outer diameter of the electrode such that the triangular passage formed thereof is matched to the outer diameter of the electrode. Those three accurate rods are suitable disposed within the mounting groove of the receiving barrel. The size of the triangular passage can be readily adjusted by selecting different accurate rods. As a result, different size of electrode can be readily supported by the triangular passage for a machining work. An accurate machining work can be therefore done.

2 Claims, 2 Drawing Sheets

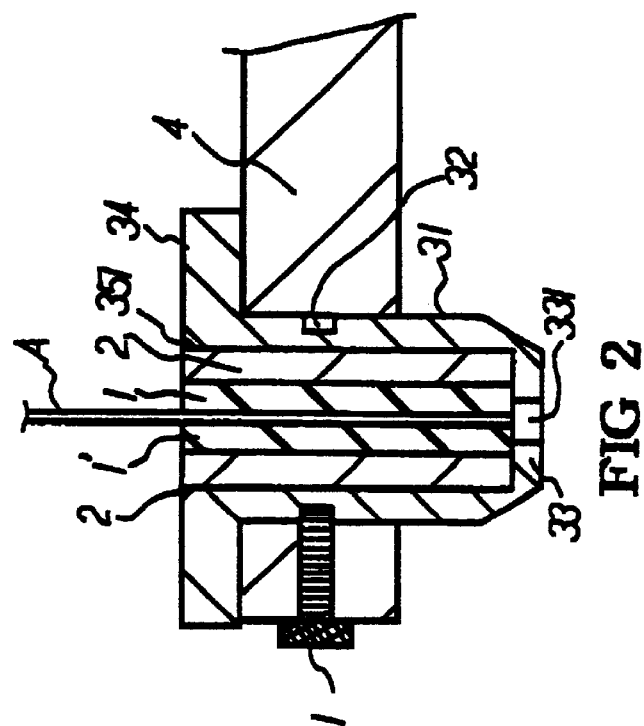
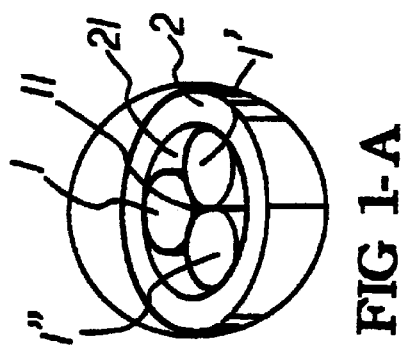
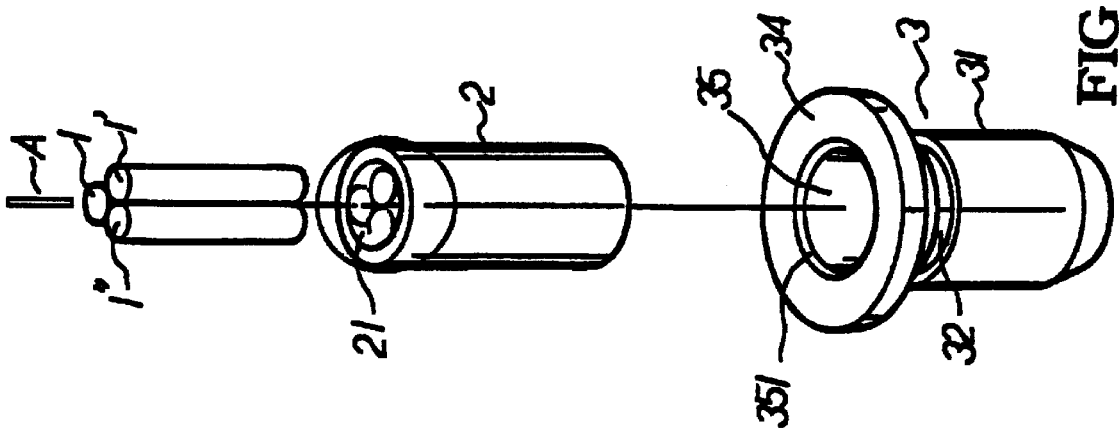

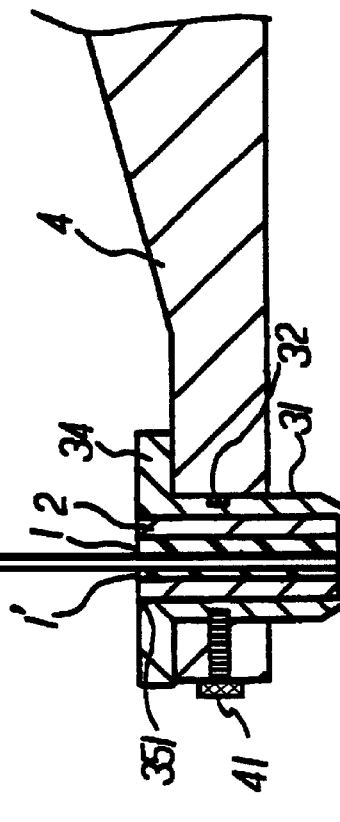
FIG 3
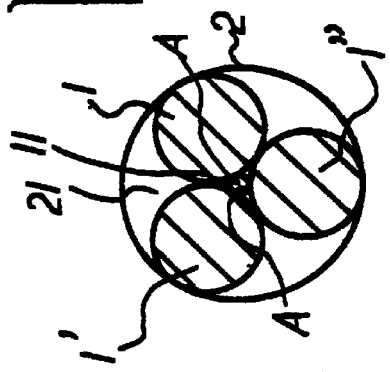
FIG 4-A
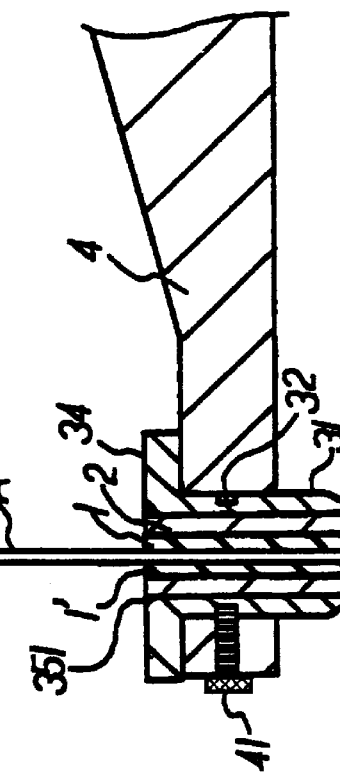
FIG 4

EYE MOLD DEVICE FOR CALIBRATING THE ELECTRODE OF AN ELECTRICAL MACHINING APPARATUS

FIELD OF THE INVENTION

The present invention relates to an eye mold device for electrical machining device in which the electrode with different outer diameter can be readily and firmly supported within the eye mold for machining. According to one aspect of the present invention, a triangular passage is defined by three accurate rods which are disposed within a mounting groove of a receiving barrel. When the electrode is inserted within the triangular passage, the electrode can be vertically and firmly supported and calibrated therein. By this arrangement, the electrode can be prevented from skewing during the machining process. On the other hand, the circularity and verticality of the performed hole can be kept. The size of the triangular passage is defined and dependent to the outer diameter of those three accurate rods. In practice, those three accurate rods are selected and based on the outer diameter of the electrode such that the triangular passage formed thereof is matched to the outer diameter of the electrode. Those three accurate rods are suitable disposed within the mounting groove of the receiving barrel. The size of the triangular passage can be readily adjusted by selecting different accurate rods. As a result, different size of electrode can be readily supported by the triangular passage for a machining work. An accurate machining work can be therefore done.

DESCRIPTION OF PRIOR ART

The electrical machining apparatus is used to machine a hole on a workpiece by electrically discharging. The chuck of a general machining apparatus can be readily replaced with a rotational chuck in which an electric tube can be held. Then a hole can be machined by the rotational electric tube. On the other hand, an electrical machining apparatus specially designed for fine hole can be also applied for machining hole. However, this special electrical machining apparatus may only use an electrode with larger outer diameter. If an electrode with small diameter is applied, a swing on the free end of the electrode will be generated during the rotation of the chuck.

The electrical tube is a copper tube which is filled with pressurized water during the machining. The electrical tube is supplied with power. During the machining, the electrical tube is rotated and the workpiece is also machined. While the workpiece is machined with a hole, a carbon deposit will be generated during the machining process. As a result, the pressurized liquid is used to flush out the carbon deposit. Because the electrical tube has a certain diameter, the hole to be machined is limited to a certain range, i.e. the inner diameter of the machined hole can not be less than the outer diameter of the electrical tube. As limited by the existing technology, it is impossible to make an electrical tube having an outer diameter of 0.1 mm. As a result, the electrical machining apparatus can not be used to machine the extremely fine hole.

In order to overcome the bottleneck, an electrical rod is used to machine a hole. The electrical rod is a solid copper rod which is soft and slim as a hair. When this hair-like rod is held by a chuck, the hair-like rod tends to skew. Even an irregular skewing can be happened. If the user utilizes a general eye mold to calibrate and adjust this hair-like electrical rod, it is impossible to machine a hole whose inner diameter is small than 0.1 mm. Then reason is the eye mold have to provide a larger passage to receive the electrical rod. As a result, a gap will be generated between the eye mold and the electrical rod, i.e. the electrical rod can not be firmly and completely supported by the eye mold. Consequently, during the machining process, the electrical rod will skew and the machined hole is not a truly circular hole. Besides, as the electrical rod is rotated during the machining process, the inner diameter of the machined hole is apparently larger then the desired one. In light of this, it is impossible to machine an extremely fine hole with the existing electrical machining apparatus. This is still a dream of the user.

SUMMARY OF THE INVENTION

It is the objective of this invention to provide an eye mold device for electrical machining apparatus wherein an extremely fine machining work can be performed.

It is still the objective of this invention to provide an eye mold device for electrical machining device in which the electrode with different outer diameter can be readily and firmly supported within the eye mold for machining. According to one aspect of the present invention, a triangular passage is defined by three accurate rods which are disposed within a mounting groove of a receiving barrel. When the electrode is inserted within the triangular passage, the electrode can be vertically and firmly supported and calibrated therein. By this arrangement, the electrode can be prevented from skewing during the machining process. On the other hand, the circularity and verticality of the performed hole can be kept.

It is still the objective of this invention to provide an eye mold device for calibrating the electrode of an electrical machining apparatus wherein the size of the triangular passage is dependent to the outer diameter of the three accurate rods. The selection of the mounting groove of the receiving barrel is depended to the outer diameter of the three accurate rods. By this provision, the size of the triangular passage can be readily defined for a selected electrode which can be suitably calibrated. By this provision, the range of the electrode can be extended and a special machining result can be attained. Even an extremely fine electrode can be applied and the performed hole can be provided with the circularity and verticality.

BRIEF DESCRIPTION OF DRAWINGS

In order that the present invention may more readily be understood the following description is given, merely by way of example with reference to the accompanying drawings, in which:

FIG. 1 is a perspective view of the present invention;

FIG. 1A is an enlarged view in which those three accurate rods are disposed within a mounting slot of a receiving barrel;

FIG. 2 is a cross sectional view of the present invention;

FIG. 3 is a schematic illustration in which the electrode is still not fed into the eye mold;

FIG. 4 is a schematic illustration in which the electrode has been fed into the eye mold; and FIG. 4A is a cross sectional view showing the electrode and the eye mode.

DETAILED DESCRIPTION OF PREFERRED EMBODIMENT

Referring to FIG. 1, three accurate rods 1, 1' and 1" are arranged longitudinally with its outer perimeters and are received within a mounting groove 21 of a receiving barrel 2. An eye mold bracket 3 is configured with a tube 31 having an annular groove 32 at the outer peripheral. The bottom of the tube 31 is provided with a supporting surface 33 which is provided with a opening 331 in the central position, as shown in FIG. 2. The tube 31 is extended upward with a cap flange 34 which is provided with a chamfered edge at the groove edge 351 between the cap flange 34 and the eye mold receiving groove 35. Referring to FIG. 2, the eye mold bracket 3 is fixedly mounted onto a eye molding fixing socket 4 of an electrical machining apparatus via the tube 31. A locking screw 41 which is passed through the side portion of the fixing socket 4 and is also located within the annular groove 32 of the tube 31. By this arrangement, the eye mold bracket 3 can be fixedly locked into the fixing socket 4.

Referring to FIGS. 1, 1A and 2, those three accurate rods 1, 1' and 1" are butted against with each other by its perimeter and are further received within the mounting groove 21 of the receiving barrel 2. As a result, those three accurate rods 1, 1' and 1" can be suitably supported by the supporting surface 33 located at the bottom of the tube 31 of the eye mold bracket 3. Accordingly, those three accurate rods 1, 1' and 1" can be retained within the receiving groove 21. In the central position defined by those three accurate rods 1, 1' and 1", a substantially triangular electrode eye mold passage 11 is defined. When the electrode A is passed through the triangular passage 11 defined by those three accurate rods 1, 1' and 1", a precise and tight contact can be readily supported by the triangular passage 11, i.e. an internal supported circle. By this arrangement, the electrode eye mold passage 11 can be provided with an extremely fine bore and which can be used to calibrate the fine electrode A which passes through the triangular passage 11. As a result, even a sector Al of the electrode A has extended over the electrode eye mold 11 for a certain distance, the sector Al is still kept vertically.

Referring to FIGS. 1, 1A and 4A, the calibration of the triangular passage 11 is defined and controlled by the diameter of those three accurate rods 1, 1' and 1". In practice, the diameter of the accurate rods are firstly selected, then the inner diameter of the mounting groove 21 of the receiving barrel 2 is further selected. When the selected accurate rods are mounted into the mounting groove 21 of the receiving barrel 2, a desired triangular passage 11 is defined and attained. Since those three accurate rods 1, 1' and 1" can be readily selected for the electrode A with different diameter, the sector Al which passes through the triangular passage 11 can be kept vertically. By this arrangement, the application specification of the electrode A can be expanded. Even an extremely fine electrode can be applied. As a result, the circularity and verticality of the work can be readily kept.

Referring to FIG. 2, before the electrode A is fed into the electrode eye mold 11, there is still a skew of the electrode A because it is too slim. In feeding, the electrode A is fed into the triangular passage 11 manually and slowly.

While the electrode A is descending slowly, the electrode A is adjusted and calibrated by those three accurate rods 1, 1' and 1", as shown in FIG. 4A.

Referring to FIG. 4 again, finally the electrode A is passed through the electrode eye mold 11 and directed over the opening 331 of the eye mold 3. Because the electrode A is calibrated, the sector Al is still kept vertically.

Referring to FIG. 2, when an electrode A with different diameter needs to be mounted, the chamfered edge of the groove edge 351 of the eye mold 3 can be applied. A robust space can be defined between the chamfered edge and the receiving barrel 2 such that the receiving barrel 2 can be readily removed therefrom. When the existing receiving barrel 2 is removed, a new receiving barrel 2 can be installed to match the mounting groove 21. Then it can be disposed within the eye mold receiving groove 35 of the eye mold 3. Afterward, three accurate rods 1, 1' and 1" having desired diameter can be disposed within the mounting groove 21 of the receiving barrel 2. As a result, a triangular passage 11 having new specification is defined. A new electrode A can be therefore well supported and retained by the triangular passage 11 defined by those three new accurate rods 1, 1' and 1".

From the forgoing description, the electrode A can be readily calibrated and supported by the triangular passage 11 defined by three accurate rods. As the electrode A is accurately and vertically supported thereof, an extremely fine hole can be therefore machined by the application of the electrode A. The performance of the machining apparatus can be therefore increased and expanded.

I claim:

1. An eye mold device for calibrating the electrode of an electrical machining apparatus which utilizes the fixing socket of an electrical machining apparatus as an eye mold and which is used for general fine hole, characterized in that a receiving barrel is disposed within said eye mold which defines a mounting groove thereof, three accurate rods being further disposed within said mounting groove such that the perimeter of each of said rods is butted against the other rods, a substantially triangular passage being defined centrally within said three accurate rods for an electrode, said electrode being firmly supported and calibrated within said substantially triangular passage such that the extended sector of said electrode is kept vertically, wherein the hole machined therefrom can be provided with excellent circularity and verticality and the performance of the machining apparatus can be expanded.

2. An eye mold device for calibrating the electrode of an electrical machining apparatus as recited in claim 1, wherein the size of said triangular passage is dependent upon the outer diameter of said three accurate rods, the selection of said mounting groove of said receiving barrel is dependent upon the outer diameter of said three accurate rods, by this provision, the size of said triangular passage can be readily defined for a selected electrode which can be suitably calibrated, by this provision, the range of said electrode can be extended and a desired machining result can be attained.

* * * * *